June 17, 1941.                    W. L. McGRATH                    2,245,802
CONDITION CONTROLLING SYSTEM OF THE FOLLOW-UP TYPE
Filed Sept. 24, 1938                    2 Sheets-Sheet 1

Inventor
William L. McGrath
By
George H. Fisher
Attorney

June 17, 1941.  W. L. McGRATH  2,245,802
CONDITION CONTROLLING SYSTEM OF THE FOLLOW-UP TYPE
Filed Sept. 24, 1938  2 Sheets-Sheet 2

Inventor
William L. McGrath
By
George H. Fisher
Attorney

Patented June 17, 1941

2,245,802

UNITED STATES PATENT OFFICE 2,245,802

CONDITION CONTROLLING SYSTEM OF THE FOLLOW-UP TYPE

William L. McGrath, St. Paul, Minn., assignor to Minneapolis-Honeywell Regulator Company, Minneapolis, Minn., a corporation of Delaware Application September 24, 1938, Serial No. 231,611

16 Claims. (Cl. 236—78)

The present invention relates to condition controlling systems of the follow-up type. Such systems normally employ a motor operated condition controlling device, the energization of the motor being controlled by one or more condition responsive control devices and by a follow-up device in such a manner that the condition controlling device is positioned in accordance with the value of the controlling condition or conditions.

An object of the present invention is to provide a condition controlling system of the follow-up type in which upon a rapid change in the value of the condition, only a small movement of the condition controlling device is permitted.

A further object of the present invention is to provide a system such as set forth in which two condition responsive devices are employed, one being quickly responsive to changes in the condition and the other only slowly responsive.

A still further object of the invention is to provide a condition controlling system of the follow-up type wherein a device relatively quickly responsive to a condition has direct control of the actuating means for the condition controlling device and wherein a device only slowly responsive to the condition adjusts the control of the first named condition responsive device.

A further object of the present invention is to provide a system such as set forth in the preceding object in which the adjustment of the control of the first named condition responsive device is to shift the range of movement of the controlling device resulting from a movement of the condition responsive device through its range of movement.

A further object of the present invention is to provide a system such as set forth in the next to the last preceding object in which the adjustment of the control of the first named condition responsive device is to compensate for changes in the demand for conditioning medium necessary to maintain a desired value of the condition.

A further object of the invention is to provide a condition controlling system of the follow-up type wherein a relatively rapid actuator is employed to move the condition controlling device, wherein the relation between the condition responsive device and the follow-up means is initially such that only a small movement of the condition controlling device is permitted, and wherein a slow speed actuator adjusts the relation between the condition responsive device and the follow-up means to permit a greater movement of the controlling device.

Other objects of the present invention will be apparent from a consideration of the accompanying specification, claims and drawings, in which Figure 1 is a schematic view of one form of the control system of the present invention, and in which

Figure 1:
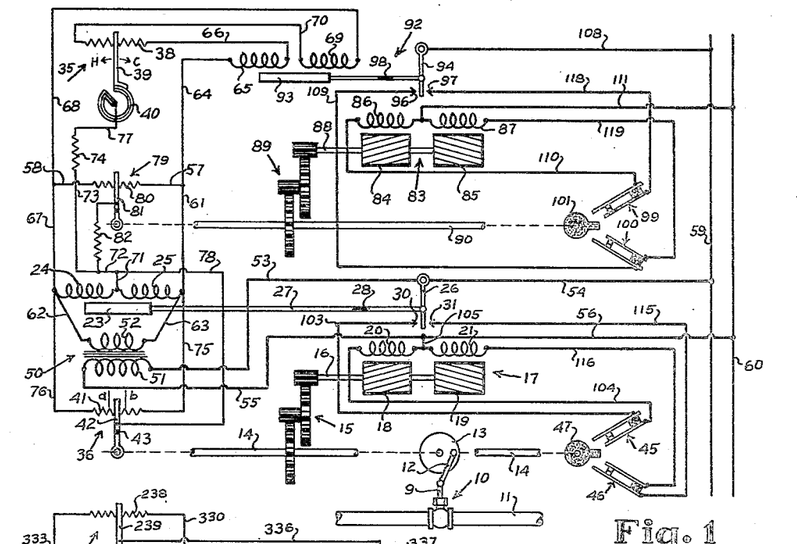

Referring to the drawings, there is shown in Figure 1 one form of the condition controlling system of the present invention. The reference numeral 10 is used to designate a valve controlling the flow of fluid through a pipe line 11. The fluid may be any condition changing medium such as steam flowing to a steam radiator or gas flowing to a gas burning furnace. The valve 10 is provided with a valve stem 9 which is connected through a link 12 with a crank disc 13 secured to a shaft 14. The shaft 14 is connected through a reduction gear train 15 with the drive shaft 16 of a reversible induction motor, generally indicated by the reference numeral 17. This motor comprises two rotor elements 18 and 19 with which are associated field windings 20 and 21, respectively. When field winding 20 is energized, the motor 17 rotates in one direction and when field winding 21 is energized the motor rotates in the other direction.

The energization of the motor is controlled by a relay which comprises an armature 23, a pair of relay windings 24 and 25, and a switch blade 26 connected to the armature 23 through a link 27. Interposed in the link is an insulating member 28. The switch blade 26 is adapted to selectively engage with either of two contacts 30 or 31, depending upon the relative energization of coils 24 and 25. Thus, when coil 25 is more highly energized, the armature 23 is drawn to the right to cause engagement of switch blade 26 with contact 31.

The relative energizations of coils 24 and 25 are primarily controlled by two variable impedance controllers 35 and 36, which, for purposes of illustration, are shown in the form of potentiometers.

Potentiometer 35 comprises a resistance coil 38, a contact arm 39, and a temperature responsive actuator 40 for the arm 39. The temperature responsive actuator is shown in the form of a conventional bimetallic element. The bimetallic element is so disposed that upon a decrease in temperature, the arm 39 is moved to the right and upon an increase in temperature is moved to the left, as indicated by the legends C and H on the drawings.

The potentiometer 36 is the follow-up potentiometer and is provided for the purpose of rebalancing the energization of the two coils of the relay when the valve arrives at the controlling position corresponding to the position of contact arm 39. The potentiometer 36 comprises a resistance 41 and a contact arm 42 which is secured through an insulated connection 43 to the shaft 14. Thus upon any movement of shaft 14 to change the position of valve 10, the contact arm 42 is correspondingly actuated.

Also controlling the energization of the relay is a pair of limit switches 45 and 46. Each of these limit switches is provided with a relatively short inner blade and a relatively long outer blade. The outer blades are adapted to be engaged by an insulated arm 47 secured to shaft 14. When shaft 14 reaches either of the positions corresponding to the extreme positions of movement of valve 10, the arm 47 engages the long blade of the respective switch and opens this limit switch.

Low voltage power is supplied to the control system by a step-down transformer 50. This transformer comprises a line voltage primary 51 and a low voltage secondary 52. The line voltage primary is connected by wires 53, 54, 55, and 56 to line wires 59 and 60. Line wires 59 and 60 lead to any suitable source of power (not shown).

The secondary 52 is connected to the opposite terminals of relay coils 24 and 25 by conductors 62 and 63. The relay coils 24 and 25 are connected in series and are thus connected directly across the source of power. The two potentiometers 35 and 36 serve to control the relative energizations of the two relay coils 24 and 25. The right-hand end of resistance 38 is connected to the right-hand end of relay coil 25 through conductors 61 and 64, a relay coil 65, and a conductor 66. The left-hand end of relay coil 24 is connected to the left-hand end of resistance 38 through conductors 67 and 68, relay coil 69, and conductor 70. The junction of the relay coils 24 and 25 is connected through conductors 71, 72, and 73, resistance 74, conductor 77 and bimetallic element 40 to contact arm 39. Thus the potentiometer 35 is connected in parallel with relay coils 24 and 25. The potentiometer 36 is similarly connected with the relay coils. The right and left-hand ends of the two relay coils are connected to the right and left-hand ends of the potentiometer resistance 41 by conductors 75 and 76. The junction of relay coils 24 and 25 is connected through conductors 71 and 78 to the contact arm 42 of potentiometer 23. The two potentiometers 35 and 36 are thus connected to the relay coils in parallel with the source of power and act as voltage dividers. When arm 39 of potentiometer 35 is moved to the right, for example, the energization of coil 24 relative to that of coil 25 will be increased and if arm 42 of potentiometer 36 is subsequently moved to the left sufficiently, the balance in the energization of the coils will be restored.

It is to be noted that in the connections traced, the resistance 74 is connected between the junction of coils and contact arm 39 of potentiometer 35 while no resistance is connected between the junction of the coils and contact arm 42 of potentiometer 36. The effect of the resistance 72 is to render the controller 35 less effective so that a given movement of this controller has less effect than a given movement of the follow-up potentiometer. Thus, the resistance 74 may be so chosen that for a full movement of contact arm 39, the rebalancing of the system will be effected by a movement of arm 42 over the range between lines a—b.

The position of the range a—b is controlled by a third potentiometer 79. This potentiometer comprises a resistance 80 and a contact arm 81. The resistance 80 is connected through conductors 57 and 61 on the one hand, and conductors 58 and 67, on the other hand, to the opposite ends of the relay coils. The arm 81 is connected through resistance 82 and conductors 72 and 71 to the junction of the two coils. It will be noted that the potentiometer 79 is connected in parallel with potentiometer 35. The effect of a given movement of contact arm 81 is to shift the position of range a—b in the opposite direction to that in which the arm 81 is moved. The resistance 82 is provided for decreasing the effect of the potentiometer 79. The value of resistance 82 is so chosen with respect to that of resistance 74 that the valve is moved to its extreme position when both contact arms 39 and 81 are in their corresponding extreme positions. The operation of the potentiometer 79 will be discussed in greater detail later.

The position of contact arm 81 on the resistance 80 is controlled by a reversible motor 83. This motor comprises a pair of rotors 84 and 85 and field windings 86 and 87 associated with said rotors. The two rotors are secured on a common shaft 88 which is connected through a reduction gear train 89 with a shaft 90, to which contact arm 81 is secured. The gear train 89 is so selected that the shaft 90 is driven at a much lower speed than shaft 14. If the motor 83 is a relatively slow speed motor as compared with shaft 17, then the gear trains 15 and 89 may give the same amount of reduction. If, on the other hand, the two motors are operable at the same speed, then the gear train must be capable of a relatively large amount of reduction compared with gear train 15.

The relative energization of field windings 86 and 87 is controlled by a relay generally designated by the reference numeral 92. This relay comprises an armature 93 which cooperates with the relay coils 65 and 69 and which is connected to a switch blade 94 which selectively engages contacts 96 and 97. An insulated connection 98 is located between the armature 93 and switch blade 94.

The energization of the motor is also controlled by a pair of limit switches 99 and 100 with which cooperates an insulated arm 101 secured to shaft 90. The action of the arm 101 and the limit switches 99 and 100 is the same as that previously described in connection with limit switches 45 and 46. In other words, the limit switches are set to operate when the contact arm 81 approaches the ends of resistance 80.

Operation of Figure 1 species

The elements are shown in the drawings in the position they assume when the temperature is at substantially the desired value. In this position, the valve 10 is partially open so as to supply an average amount of conditioning fluid through pipe 11. Let it be assumed now that the temperature drops. This will cause the movement of contact arm 39 to the right and this, by reason of the parallel connection of potentiometer 35 with the two relay coils 24 and 25, causes relay coil 24 to be more highly energized and relay coil 25 less highly energized. The result is that relay armature 23 is drawn to the left causing engagement of switch blade 26 with contact 30. When this takes place, the following energizing circuit is established to the field winding 20 of motor 17: from line wire 59 through conductor 54, switch blade 26, contact 30, conductor 103, limit switch 45, conductor 104, field winding 20, and conductors 105 and 56 to the other line wire 60. This causes the motor 17 to rotate in a direction such that the shaft 14 is rotated in a counter-clockwise direction, causing a counter-clockwise rotation of crank disc 13 and of arm 42. The counter-clockwise rotation of crank disc 13 results in valve 10 being moved towards open position to cause a greater flow of the temperature increasing fluid through pipe 11.

The movement of contact arm 42 in a counter-clockwise direction, or in other words, to the left on resistance 41 tends to compensate for the movement of arm 39 to the right. Due to the presence of resistance 74, however, a very small movement of contact arm 42 has the same effect as a relatively large movement of contact arm 39. Thus after a very short movement of valve 10 and consequently of contact arm 42 of follow-up potentiometer 36, the energization of relay coils 24 and 25 will again be balanced so that armature 23 once more assumes the neutral position shown in the drawings in which switch blade 26 is in engagement with neither contact 30 nor contact 31.

If the change in temperature which caused the movement of contact arm 38 is a very slight and temporary one, the action which has taken place is substantially the only one that directly follows from the change in temperature. If, however, the change in temperature is substantial and persists, indicating a greater heat demand, the potentiometer 79 will be adjusted through the action of motor 83. It will be noted that in the connections between the right-hand and left-hand ends of the two relay coils 24 and 25 and the right and left-hand ends, respectively, of potentiometer resistance 38, there are included relay coils 65 and 69. It will further be obvious that whenever the contact arm 39 is in any but the mid position of resistance 38, a different amount of current will flow in relay coil 65 than in relay coil 69. Thus upon the contact arm 39 moving to the right accompanying a temperature drop, the resistance in series with relay coil 65 is decreased and that in series with relay coil 69 is increased so that relay coil 65 becomes more highly energized and relay coil 69 less highly energized. The result is that the armature 93 is drawn to the left causing engagement of switch blade 94 with contact 96. When this takes place, field winding 87 is energized by the following circuit: from line wire 59 through conductor 108, switch blade 94, contact 96, conductor 109, limit switch 100, conductor 119, field winding 87, and conductor 111 to the other line wire 60. The resulting energization of field winding 87 causes the motor 83 to rotate in a direction such as to move shaft 90 in a clockwise direction. The movement of shaft 90 in a clockwise direction causes contact arm 81 to move to the right with respect to resistance 80. Since potentiometer 79 is in parallel with the control potentiometer 35, the movement of contact arm 80 to the right has the same effect as a further movement of contact arm 39 to the right. The result is, accordingly, that relay coils 24 and 25 are again unbalanced so as to cause relay coil 24 to again be more highly energized than relay coil 25, again causing switch blade 26 to engage contact 30 and to cause the motor to operate in the manner previously described. The result is that valve 10 is opened still farther and contact arm 42 is moved farther to the left so as to again rebalance the two relay coils 24 and 25 with the valve in a wide open position. This action will continue to take place so long as the temperature is away from normal until the contact arm 101 engages limit switch 100, at which time the field winding 87 of motor 83 will be deenergized. At this point, the valve is as wide open as possible for the position of contact arm 39.

The opening of valve 10 may sooner or later cause a rise in the temperature to which bimetallic element 40 is subjected. This will result in a return movement of contact arm 39 towards the left. This will result in relay coil 25 becoming more highly energized than relay coil 24 so as to move armature 23 to the right and to move switch blade 26 into engagement with contact 31. The result of this is that the following energizing circuit is established to motor field winding 21: from line wire 59 through conductor 54, relay switch blade 26, contact 31, conductor 115, limit switch 46, conductor 116, field winding 21, and conductors 105 and 56 to the other line wire 60. The establishment of this energizing circuit to field winding 21 causes the motor to rotate in the opposite direction to that previously described and hence to cause shaft 14 to rotate in a clockwise direction. The clockwise rotation of shaft 14 causes valve 10 to be moved towards closed position. Clockwise rotation of shaft 14 also causes contact arm 42 to move towards the right. The effect of this is to compensate for the previous movement of contact arm 39 to the left, which movement initiated the operation of the motor. After contact arm 42 has moved a predetermined amount on resistance 41 depending upon the position of contact arm 39, the two relay coils 24 and 25 will be rebalanced. As soon as rebalance of the energization of the two relay coils is effected, switch blade 26 will move to the position shown in the drawings, in which position the operation of the motor is terminated.

As previously indicated, contact arm 81 will continue to be moved towards the right until contact arm 39 returns to its mid position or until limit switch 100 is opened. Thus whenever the call for heat is particularly prolonged, the control range a—b will be moved to the extreme left wherein the maximum amount of heat is being supplied. If the heat demand decreases, the effect of this will be that the temperature will continue to rise until contact arm 39 has passed the mid position. When this happens, relay coil 69 becomes more highly energized than relay coil 65 so that switch blade 94 will be moved into engagement with contact 97. When this happens, a circuit is established to the field winding 86 of motor 83 as follows: from line wire 59 through conductor 108, contact arm 94, contact 97, conductor 118, limit switch 99, conductor 110, field winding 86, and conductor 111 to the other line wire 60. This will cause rotation of shaft 90 in a counter-clockwise direction so as to cause movement of arm 81 to the left. The movement of arm 81 to the left results in the energization of relay coils 24 and 25 being unbalanced so as to cause a movement of the valve 10 such that the contact arm 42 is moved to the right to rebalance the energization of relay coils 24 and 25. The movement of the valve which takes place when arm 42 moves to the right is a movement towards closed position. In other words, the effect of the movement of arm 81 to the left is to cause the range *a—b* to be shifted to the right and the range of movement of the valve to be shifted towards closed position. This is the desirable action inasmuch as the fact that the temperature is above the desired setting and continues above the desired setting is an indication that the valve is being controlled over a range too near to open position.

It will be seen that with the species of Figure 1, a quick change in temperature will cause a relatively quick but small change in the valve position. If this change persists, the range of movement of the valve will be shifted so that the valve is moved further towards the position indicated as necessary by reason of the change in temperature. Thus the system makes possible a quick change in position of the controlled object without any danger of overshooting and at the same time with provision for changes in the heat demand.

Figures 2, 3:
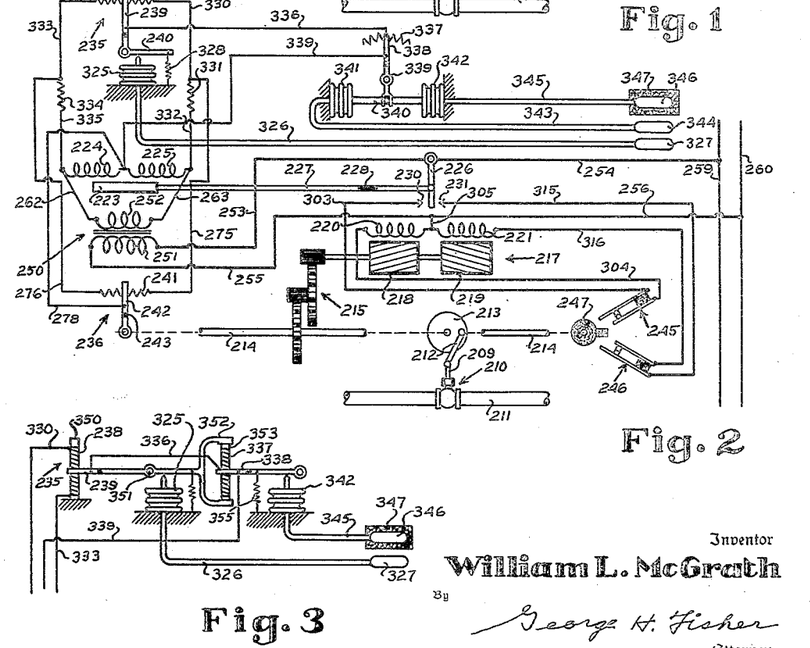
Figures 2 to 5 are schematic views of modified forms thereof.

Figure 2 species

In Figure 2, there is shown a species wherein the amount of opening of the valve for a quick change in temperature is limited as in the Figure 1 species but in which slightly different apparatus is employed for accomplishing this purpose. In order to enable a more ready comparison of the two figures, the corresponding elements of Figure 2 have been designated by reference numerals 200 higher than the reference numerals applied to the similar elements in Figure 1. Thus a valve 210 controls the flow of heating medium through a pipe 211, the valve having a valve stem 209 which is connected through a link 212 to a crank disc 213. Crank disc 213 is secured to a shaft 214 which is connected by means of a gear train 215 to a motor 217. The motor comprises rotors 218 and 219 with which are associated field windings 220 and 221, respectively.

The energization of the motor, which is of the same type as motor 17, is controlled by a relay comprising a relay core 223, relay coils 224 and 225, and a switch blade 226 which is adapted to cooperate with contacts 230 and 231. A contact blade 226 is connected by a link 227 to the core 223, the link having a portion 228 of insulating material. The relay is of the balanced type so that when relay coils 224 and 225 are equally energized, armature 223 and switch blade 226 are in their mid positions. Upon relay coil 224 being more highly energized than relay coil 225, the armature 223 is moved to the right causing switch blade 226 to be similarly moved so that the same is moved into engagement with contact 230. When relay coil 224 is the more highly energized, on the other hand, the switch blade 226 is moved into engagement with contact 231.

As in the species of Figure 1, the relative energizations of the two relay coils 224 and 225 is controlled by a control potentiometer 235 and a follow-up potentiometer 236. The control potentiometer comprises a resistance 238 over which moves a contact arm 239. Contact arm 239 is in the form of a bell-crank lever against the lower arm 240 of which a fluid filled bellows element 325 acts. Bellows element 325 is connected by capillary tubing 326 to a bulb 327, which bulb is located so as to be exposed to a controlling temperature. The bulb is preferably filled with some vaporizable substance so that bellows 325 is subjected to the vapor pressure of the substance. It will be obvious that upon a temperature rise, the arm 239 is moved to the right, and upon a temperature fall is moved to the left. A spring 328 is employed for holding arm 240 in contact with the bellows.

The potentiometer 236 is identical to the potentiometer 36 of the preferred species. In other words, this potentiometer comprises a resistance 241 over which moves a contact arm 242 connected by means of an insulated connection 243 to the shaft 214. As in the Figure 1 species, the shaft 214 is provided at the opposite end of contact arm 242 with an insulating arm 247 which is adapted to cooperate with limit switches 245 and 246. The structure and function of these limit switches are identical to that of limit switches 45 and 46 so that it is not necessary to describe them here.

A step-down transformer 250 comprises a line voltage primary 251 and a low voltage secondary 252. The line voltage primary is connected by conductors 253, 254, 255, and 256 to line wires 259 and 260. The secondary 252 is connected by conductors 262 and 263 to the opposite end of relay coils 224 and 225.

As in the preferred species, the two relay coils 224 and 225 are thus connected directly across the power source. Similarly, as in the preferred species, the two potentiometers 235 and 236 are connected in parallel with each other to the relay coils 224 and 225. The right-hand end of resistance 238 of the control potentiometer 235 is connected to the right-hand end of relay coil 225 by conductor 330, protective resistance 331 and conductor 332. The left-hand end of resistance 238 is connected to the left-hand end of relay coil 224 by conductor 333, protective resistance 334 and conductor 335. The contact arm 239 is connected to the junction of relay coils 224 and 225 by means of conductor 336, resistance 337, contact arm 338 and conductor 339. The right and left-hand ends, respectively, of resistance 241 of the follow-up potentiometer 236 are connected by conductors 275 and 276 to the right and left-hand end conductors 330 and 333 which are, in turn, connected to the right and left-hand ends of resistance 238. The contact arm 242 is connected through conductor 278 to the junction of the two relay coils 224 and 225.

Inasmuch as the two potentiometers 235 and 236 are connected in parallel across relay coils 224 and 225, it will be obvious that any effect upon the balance of the energization of the relay coils caused by a movement of the control potentiometer 235 can be compensated for by a sufficient movement of the contact arm 242 of the rebalancing potentiometer in the opposite direction. Thus if contact arm 239 is moved to the right as a result of a drop in temperature, relay coil 224 will become more highly energized than relay coil 225. The resulting movement of the motor is such that contact arm 242 is moved to the left so as to tend to increase the energization of relay coil 225 and decrease that of relay coil 224. As the shaft 214 continues to rotate, a point will be reached at which the energization of the coils will be rebalanced. It will be noted that the circuit between contact arm 239 and the junction of relay coils 224 and 225 included a resistance member 337. In the position of the contact arm 238 shown in the drawings, the amount of resistance that is in the circuit is negligible. Upon contact arm 238 moving either to the left or to the right, however, the amount of resistance 337 in the circuit will be increased. This has the same effect as the resistance 74 in the species of Figure 1. In other words, the amount of movement of the valve resulting from a given movement of the contact arm 239 is decreased.

The apparatus is so designed that contact arm 338 is moved from its mid position only in the event of relatively quick temperature changes. The arm 338 is pivotally mounted at 339 and at its lower end is connected with a rod 340 which, in turn, is connected to two opposed bellows 341 and 342. The bellows element 341 is connected through a capillary tube 343 to a bulb 344 containing a vaporizable substance. Similarly, bellows 342 is connected by a capillary tubing 345 to a bulb 346 containing a similar vaporizable substance. The bulb 346, unlike the bulb 344, is surrounded by insulating material 347. The three bulbs 327, 344 and 346 are all exposed to the same controlling temperature. The two bulbs 327 and 344, however, respond relatively quickly to a temperature change whereas bulb 346, by reason of its insulating covering 347, responds only slowly to temperature changes. It will be obvious that any slow temperature change will affect both bulbs 344 and 346 substantially equally so that both of the bellows elements 341 and 342 will be subjected to substantially the same pressure so that arm 338 is not moved appreciably. If, however, the temperature change is rapid, bulb 344 is the first one to feel the effect of the temperature change so that the arm 338 moves in the direction dictated by the change in pressure in bellows 341. Thus upon a sudden temperature rise, the arm 338 will be moved to the right whereas upon a rapid temperature fall, the contact arm 338 will be moved to the left.

Operation of Figure 2 species

The various elements are shown in Figure 2 in the position they occupy when the temperature is at approximately the desired value. Let it be assumed that the temperature begins to fall and that this fall is extremely slow so that the position of arm 338 is not shifted. The fall in temperature results in a movement of contact arm 239 to the right which, as previously indicated, causes an increase in the energization of relay coil 224 with respect to that of relay coil 225. The result is that armature 223 is drawn to the left moving arm 226 into engagement with contact 230. This, in turn, causes a circuit to be established to motor winding 220 as follows: from line wire 259 through conductor 254, switch blade 226, contact 230, conductor 303, limit switch 245, conductor 304, field winding 220 and conductors 305 and 256. The resultant energization of field coil 220 causes the motor 217 to rotate in a direction so that shaft 214 is rotated in a counter-clockwise direction. The rotation of shaft 214 in the counter-clockwise direction causes a similar movement of crank disc 213 so that valve 210 is moved towards open position. This results in more of the heating fluid being admitted to the device utilizing the same so as to tend to supply the increased heat demand. At the same time, arm 242 is moved to the left. When the movement has been sufficient, the energization of relay coils 224 and 225 is rebalanced and the energization of the motor is terminated.

Inasmuch as resistance 337 is not effectively connected between the contact arm 239 and the junction of relay coils 224 and 225, the two potentiometers 235 and 236 have substantially the same effect. Thus when contact arm 239 moves to the extreme right, it is necessary for contact arm 242 to move to its extreme left position, which position corresponds to valve open position. The protective resistances 331 and 334 are placed in the circuit for the purpose of taking care of this condition. Were these protective resistances not present, the secondary 252 of the transformer would be short-circuited.

If instead of the temperature drop being a slow one, it is relatively rapid, contact arm 338 will be rotated in a clockwise direction so as to insert some of the resistance 337 into the circuit between contact arm 239 and the junction of the relay coils. This resistance will have the same effect as the resistance 74 in the preferred species. In other words, this resistance will tend to cause a smaller movement of the valve for a given movement of the control potentiometer. This is desirable since a quick change may be due to some temporary condition such as the opening of a door and it would be highly undesirable to change the heat supply materially because of such a temporary condition. If the temperature change is relatively quick but continues to persist, the temperatures of the two bulbs 344 and 346 will slowly equalize so that contact arm 338 is moved back towards its mid position in which it is shown in the drawings. The effect of this will be to permit the valve to slowly open further as resistance 337 is again cut out of the circuit.

Sooner or later the temperature will very probably rise somewhat so as to cause a movement of contact arm 239 to the left. When this takes place, relay coil 225 will be the more highly energized so as to move relay switch blade 226 into engagement with contact 231. When this happens, an energizing circuit will be established to motor field winding 221 as follows: from line wire 259 through conductor 254, switch blade 226, contact 231, conductor 315, limit switch 246, conductor 316, field winding 221, and conductors 305 and 256 to the other line wire 260. The energization of field winding 221 will cause the motor to rotate in the opposite direction to that previously referred to so that shaft 214 is rotated in clockwise direction. The rotation of shaft 214 in clockwise direction causes crank disc 213 to be similarly rotated with the result that the valve is returned towards closed position. The amount that the valve is returned towards closed position will depend upon the amount of movement of contact arm 242 to the right than is necessary before the relay coils are rebalanced. The amount of such movement that is necessary will depend upon how much of resistance 337 is in the circuit between contact arm 239 and the junction of the relay coils. After a relatively quick rise in temperature, there may be a certain amount of resistance 337 connected in the circuit so that the movement of the valve will be relatively slow. This will be proper since the rise in temperature may be a temporary one.

It will be seen that with this species, provision is made in an extremely simple manner for insuring that a quick temperature change produces initially only a relatively slow movement of the valve. With this apparatus, overshooting and the resultant hunting are reduced to a minimum.

Figure 3 species

In Figure 3, there is shown a portion of a modified form of the system of Figure 2. The species of Figure 2 requires the use of three bulbs, two of which are identically alike. In the species of Figure 3, only two bulbs are necessary. In order to enable a ready comparison over Figures 2 and 3 and in order to clearly indicate where the elements of Figure 3 are connected in the system of Figure 2, the same elements have been given the same reference characters. The resistance element 238 is shown here in this figure as wound upon a rigidly supported core 350. The contact arm 239 is pivotally mounted at 351 and has its right-hand end in the form of a yoke 352 within which is supported a core 353 upon which the resistance 337 is wound. A bellows element 325 actuates the contact arm 239 as in the species of Figure 2. In this species, however, by reason of the resistance 337 being carried by an extension of contact arm 239, the bellows 325 not only actuates contact arm 239 but also the resistance 353. The contact arm 338 is actuated only by the bellows 342 against the action of a spring 355. It will be recalled that bellows 342 is the one which is connected to the insulated bulb 346.

Let it be assumed that there is a rapid rise in temperature. The effect of this will be that bellows 325 will rotate the contact arm 239 in a counter-clockwise direction to produce the same effect so far as potentiometer 235 is concerned as in the species of Figure 2. At the same time, the counter-clockwise movement of arm 239 causes an upward movement of resistance 337. Since contact arm 338 is not appreciably moved by reason of the fact that bellows 342 is connected to an insulated bulb, resistance 337 will be moved upwardly with respect to contact arm 338, producing the same effect as though contact arm 338 were moved downwardly with respect to resistance 337. If the temperature change persists, the rise in temperature will affect bulb 346 to cause bellows 342 to move contact arm 338 upwardly. The ratios of the various links are so chosen that when the temperature of bulbs 327 and 346 are equalized, contact arm 338 will be in the same relative position with respect to resistance 337 as it was before the temperature change occurred.

Thus with the species of Figure 3, the same advantageous results are obtained as were obtained with the Figure 2 species. With this species, however, only two bulbs are necessary.

Figure 4:
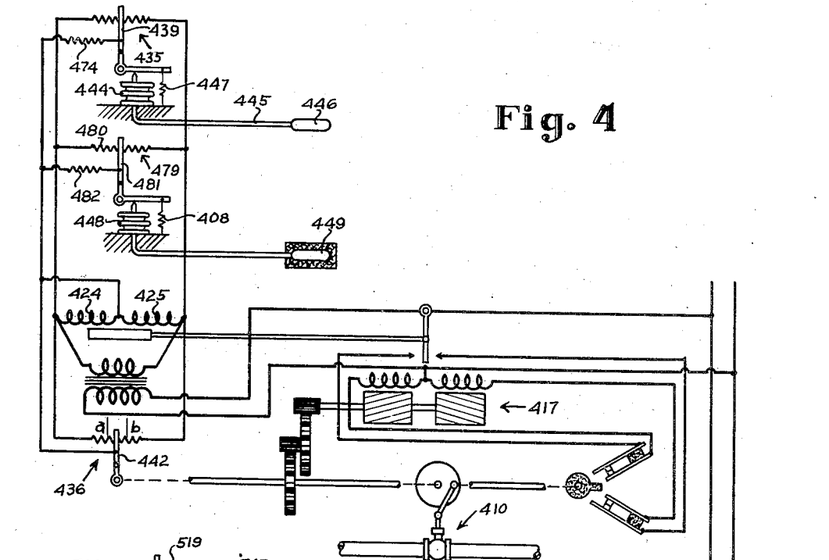

Species of Figure 4

In Figure 4, I have disclosed a further species of my invention in which the general object of preventing too great a change in valve position upon a quick temperature change is accomplished with the use of slightly different apparatus. Briefly, the species of Figure 4 is similar to that of Figure 1 with the exception that a potentiometer corresponding to potentiometer 79 of Figure 1 species is actuated by a temperature responsive element only slowly responsive to changes in temperature. Thus, upon a rapid change in temperature, the valve may be moved relatively rapidly but only over a small distance. It is not until the temperature change has been felt by the relatively slow acting element that the valve is moved as far as is possible for the temperature change that has taken place.

In order to enable an easier comparison of the two figures, the corresponding elements of Figure 4 are designated by reference numerals 400 higher than the numerals applied to the same elements of Figure 1. Moreover, inasmuch as the operation and construction of the apparatus is for the most part obvious, the apparatus of Figure 4 will not be described in detail. As in the Figure 1 species, there is a valve 410 which is positioned by means of a motor 417. The energization of the motor is controlled by a relay comprising relay coils 424 and 425. The relative energization of the two relay coils is controlled by a control potentiometer 435 and by a rebalancing potentiometer 436. Control potentiometer 435 includes a contact arm 439 in the form of a bell-crank lever which is acted upon by a bellows element 444 connected by capillary tubing 445 to a temperature responsive bulb 446. The bellows 444 is also opposed by the action of a spring 447. The bulb 446 is preferably built with a vaporizable fluid and is located so as to be subject to the controlling temperature. The potentiometers 435 and 436 are connected in the same manner and have the same relative effect as the corresponding elements in the species of Figure 1. A resistance 474, corresponding to resistance 74, results in the effect of potentiometer 435 being reduced so that a relatively large movement of contact arm 439 produces only a relatively small movement of the motor of the controlled device. By reason of this resistance, the movement of contact arm 442 of rebalancing potentiometer 436 is restricted to a range a—b. As in the species of Figure 1, the position of the range a—b can be shifted by means of a potentiometer 479, the effect of which is decreased by a resistance 482. Potentiometer 479 comprises a resistance 480 and a contact arm 481. The contact arm 481 is in the form of a pivoted bell-crank lever which is actuated by a bellows 448 connected to an insulated temperature responsive bulb 449. The action of bellows 448 is resisted by a spring 408 acting on the contact arm 481.

The action of the arrangement of the present figure is very similar to that of Figure 1. In other words, upon a rapid change in temperature taking place a corresponding movement of the valve is made, this movement being limited to a range corresponding to the range a—b of the control potentiometer 436. If the temperature change persists, indicating that the movement of the valve has not been sufficiently great for the change in heat demand, the bulb 449 will be affected by the temperature change to shift the position of contact arm 481 and hence to move the range a—b in a direction such as to permit a greater change in the heat supply. Thus upon a temperature drop causing a movement of the control arm 439 to the right, a movement of the valve towards open position and a movement of the rebalancing contact arm 442 to the left, the continuance of this temperature drop will eventually cause the contact arm 481 and potentiometer 479 to move to the right so as to cause contact arm 442 of the rebalancing potentiometer to move further to the left accompanied by a further opening of the valve.

It will thus be seen that the function of the arrangement of Figure 1 is also accomplished with the much simpler apparatus of Figure 4.

Figure 5:
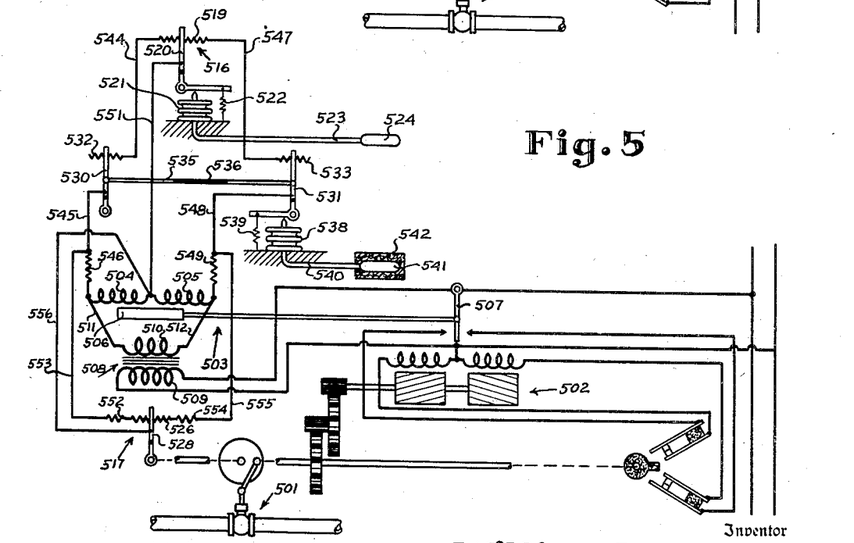

Species of Figure 5

In Figure 5, I have shown the use of apparatus quite similar to that of the Figure 4 species for accomplishing a slightly different object. In this species, the control potentiometer at all times has the power to move the valve over its entire range of movement. The temperature range over which the controller moves is sufficiently wide that there is relatively little danger from hunting. The difficulty with such a system, however, is that in order to take care of different heating loads, it is necessary to vary the temperature to which the controller is subjected. In other words, the only way in which the controller can take care of a change in the heating load is for it to assume a position which it assumes only when the temperature is not at the desired value. While such a defect is existent in any type of system of this type, unless special means are taken to avoid it, it is particularly true where the differential of the controller is widened out sufficiently far that there is no danger of hunting. The species of Figure 5 employs apparatus very similar to that of Figure 4 for overcoming this defect.

In view of the fact that there are certain marked distinctions between the apparatus of Figure 5 and those of the preceding figures, the reference numerals employed in connection with this figure have no relation to the reference numerals employed in connection with the previous figures. Since, however, the various energizing circuits for the motor and the manner in which the motor operates the valve are identical to those of the previous species, a detailed description of the structure and operation of these is not given in connection with this valve.

A valve 501 controls the supply of a heating medium to some device utilizing the same. The position of the valve is controlled by a reversible inductance motor 502, the energization of which is controlled by a relay 503 comprising relay coils 504 and 505 which jointly act upon an armature 506 connected to a switch blade 507. The manner in which the relay controls the energization of the motor is identical to that of the previous species.

A step-down transformer 508 comprises a primary 509 connected to a suitable source of power and a secondary 510. The secondary 510 is connected by conductors 511 and 512 to the opposite ends of relay coils 504 and 505. The two relay coils 504 and 505 are thus connected together in series across the source of power. The relative energization of the two relay coils 504 and 505 is controlled by a control potentiometer 516 and a rebalancing potentiometer 517. The control potentiometer comprises a resistance 519 over which moves a contact arm 520. The contact arm 520 is in the form of a bell-crank lever which is actuated by the opposing actions of a bellows member 521 and a spring 522. The bellows element 521 is connected through capillary tubing 523 to a bulb 524 containing vaporizable fluid and exposed to the temperature condition which it is desired to control. It will be obvious that upon a rise in the temperature to which the bulb 524 is exposed, the contact arm 520 will be moved in a counter-clockwise direction and that upon a fall in temperature, the arm will be moved in a clockwise direction.

The rebalancing potentiometer 517 comprises a resistance 526 and a contact arm 528 which is connected to the motor shaft through an insulated connection.

The reference numerals 530 and 531 are used to designate two contact arms which move over resistances 532 and 533, respectively. The two contact arms 530 and 531 are pivotally supported and are connected by a link 535 which has an insert 536 of insulating material to prevent any electrical connection between the two contact arms. The contact arm 531 is in the form of a pivoted bell-crank lever which is positioned by the opposing action of a bellows element 538 and a spring 539 both acting upon the arm 531. The bellows element 530 is connected by means of capillary tubing 540 to a bulb 541 which is surrounded by insulating material 542. The bulb 541, like bulb 524, contains a vaporizable fluid and is exposed to the temperature condition which it is desired to control. When the temperature is at the desired value, the right-hand portion of resistance 532 and the left-hand portion of resistance 533 are equal in value. It will be obvious that any increase in temperature will increase the right-hand portion of resistance 532 and decrease the left-hand portion of resistance 533. Upon a drop in temperature to which bulb 541 is exposed, the opposite result will be obtained.

The left-hand end of resistance 519 is connected through conductor 544, resistance 532, contact arm 530, conductor 545, and protective resistance 546 to the left-hand end of relay coil 504. The right-hand end of resistance 519 is connected through conductor 547, resistance 533, contact arm 531, conductor 548, and resistance 549 to the right-hand side of relay coil 505. The contact arm 520 of control potentiometer 516 is connected through conductor 551 to the junction of relay coils 504 and 505. It will be noted that by reason of these connections, the control potentiometer 516 is connected in parallel with the two relay coils 504 and 505 and is thus able to determine the relative energization of the two coils.

The left-hand end of resistance 526 of rebalancing potentiometer 517 is connected by a resistance 552, a conductor 553 and protective resistance 546 to the left-hand end of relay coil 504. The right-hand end of resistance 526 is connected by a resistance 554, conductor 555, and protective resistance 549 to the right-hand end of relay 505. The contact arm 528 of the rebalancing potentiometer 517 is connected through a conductor 556 to the junction of relay coils 504 and 505. It will thus be noted that the rebalancing potentiometer 517 is also connected in parallel with the relay coils, the two potentiometers 516 and 517 being connected in parallel with each other.

By reason of the parallel connection of the potentiometers 516 and 517, any effect upon the relative energizations of the two relay coils produced by movement of the contact arm 520 of control potentiometer 516 can be compensated for by an equivalent movement of arm 528 of the rebalancing potentiometer in the opposite direction. In this respect, the operation of the system is identical to that of the previous species. Thus, upon movement of contact arm 520 to the right by reason of a temperature fall, the relay coil 505 becomes more highly energized than relay coil 504. The resultant unbalance in the energization of the relay causes the motor to move the valve towards open position and move contact arm 528 to the left until the energization of the two relay coils is rebalanced.

The apparatus is so designed that when the temperature is at the desired value, the right-hand portion of resistance 532 and the left-hand portion of resistance 533 correspond in value to that of resistance 552 and 554. The result is that the potentiometer 516 has the same effectiveness as the potentiometer 517. As will be obvious from the description of the preceding species, this results in a movement of contact arm 528 over the entire range of resistance 526 for a movement of contact 520 over the entire range of resistance 519 of the control potentiometer. Since the range of movement of contact arm 528 corresponds roughly to the range of movement of the valve, the main control potentiometer 516 is able to move a valve over its entire range of movement.

Let it be assumed that the temperature is at the desired value and that the heating load changes so that it is necessary to have more of the heating medium supplied. The only way in which there can be any change in the flow of heating medium is for the temperature to change so as to change the position of the controller. Were it not for the resistance units consisting of contact arms 530 and 531 and resistances 532 and 533, it would be necessary for the temperature to deviate a substantial amount from the desired value in order to take care of heavy changes in the heating load. While such a condition could be avoided by causing a relatively large movement of the valve for a very slight movement of the control potentiometer, this would, in turn, lead to extreme hunting which it is desired to avoid by the systems of the present invention. Let it be assumed that the temperature does drop so as to cause a movement of the contact arm 520 to the right with the result that relay coil 505 is more highly energized than relay coil 504 so that the motor is operated in a direction to open the valve further and move contact arm 528 to the left until the system is rebalanced. After a substantial period of time, the temperature change will make itself felt at bulb 541 with the result that contact arms 530 and 531 will move to the left so as to increase the resistance in the left-hand portion of resistance 532 and decrease the resistance in the right-hand portion of resistance 533. This in no way changes the total resistance between contact arms 530 and 531 but it does mean that it does result in the effective position of contact arm 520 being changed. In other words, the movement of contact arms 530 and 531 to the left has had the same effect as if resistances were added to the left-hand side of resistance 519 and taken away from the right-hand side of this resistance, or in other words, the movement of contact arms 530 and 531 to the left has had the same effect as though contact arm 520 were shifted further to the right. The result is that contact arm 520 may now be moved back to its original position and still maintain the valve in its new position. The immediate effect of the movement of the arms 530 and 531 to the left is to unbalance further the energization of relay coils 504 and 505, inasmuch as, as pointed out above, the movement to the left of these contact arms has the same effect as the further movement to the right of contact arm 520. The valve 501 is equally moved still further so that heating medium supplied is more than is necessary to take care of the increased load as reflected by the change in temperature. The result is that the temperature in the room will rise causing contact arm 520 to move back towards its original position. Due to the contact arms 530 and 531 having moved to the left, however, contact arm 520 may move back to its original position and still not cause the valve to return to its original position.

It is impossible for the temperature to return to identically the same value as it had before the change in heating load inasmuch as such a change would eventually be reflected upon bulb 541 so as to cause contact arms 530 and 531 again to assume their original position so that the heating medium supplied would again be insufficient to meet the increased heat demand. By so selecting the apparatus for varying contact arms 530 and 531 and by properly selecting resistances 532 and 533, the change produced by a very small movement of contact arms 530 and 531 can be made equivalent to a substantial change of contact arm 520. In other words, a very slight temperature change acting upon bulb 540 may be made to produce the same effect as a very substantial change in the temperature acting through bulb 524. The result of this is that the temperature will return to almost the desired value, the valve being maintained in the new position by reason of the substantial change produced in the resistance of the circuit by the effect of this slight change in temperature acting through contact arms 530 and 531.

It is possible to make the unit comprising bulb 541, the contact arms 530 and 531 and the resistances 532 and 533 so that the same has a very pronounced effect upon the position of the valve for a given change in temperature without causing hunting by reason of the insulation surrounding bulb 541. It would be undesirable to insulate the main controlling bulb in this manner since this would produce too great a lag in the response of the heating system. With the arrangement of the present species, upon a temperature change taking place, the valve is adjusted relatively quickly to take care of the change in supply of heating medium necessary to correct this change in temperature condition. There is no temporary discomfort to the occupants as would be the case if the main control bulb were insulated. With the present system, however, it is not necessary to maintain a temperature considerably different from a desired value in order to take care of a substantial change in the heating load. It will thus be seen that with the arrangement of the present invention, changes in load are compensated for by an extremely simple apparatus.

While I have shown certain embodiments of my invention for purposes of illustration, it is to be understood that the invention is limited only by the scope of the appended claims.

I claim as my invention:

1. In a condition control system of the follow-up type, means for changing the value of a condition, a regulating device for said condition changing means, a motor for positioning said device, means responsive over a limited range of values to said controlling condition, means including said condition responsive means for so controlling the energization of the motor as to cause the same to move said device to a position corresponding to the value of the controlling condition, and means tending to limit the movement of said device produced as the result of a change in the value of the controlling condition over the range of response of said condition responsive means to a relatively small portion of its total range of movement and slowly to permit further movement of the device in the same direction as long as a change exists.

2. In a condition control system of the follow-up type, means for changing the value of a condition, a regulating device for said condition changing means, a motor for positioning said device, and control means for said motor including two means responsive to the same condition, one being quickly responsive and the other only slowly responsive, said control means being operative upon a slow change in the value of the condition so to control said motor as to cause said device to move to a position corresponding to the value of said condition, and upon a rapid change in the value of the condition so to control said motor as to permit said device to be moved only over a relatively small portion of its total range of movement regardless of the magnitude of the change in the value of said condition.

3. In a condition control system of the follow-up type, means for changing the value of a condition, a regulating device for said condition changing means, a motor for positioning said device, control means including a member relatively quickly responsive to a change in the value of a condition and a follow-up means driven by said motor, said control means being operative normally to cause said motor and consequently said device to move to a position dependent upon the state of said condition responsive member, and means including an element directly responsive to the same condition but only slowly responsive thereto operative to change the control action of said first named condition responsive member on said motor.

4. In a condition control system of the follow-up type, means for changing the value of a condition, a regulating device for said condition changing means, a motor for positioning said device, control means including a member relatively quickly responsive to a change in the value of a condition over a limited range of values of said condition and a follow-up means driven by said motor, said control means being operative normally to cause said motor and consequently said device to move to a position dependent upon the state of said condition responsive member, and means including an element directly responsive to the same condition but only slowly responsive thereto operative to shift the range of movement of the regulating device resulting from a change of said condition over the range of response of said first named condition responsive member.

5. In a condition control system of the follow-up type, means for changing the value of a condition, a regulating device for said condition changing means, a motor for positioning said device, control means including a member relatively quickly responsive to a change in the value of a condition and a follow-up means driven by said motor, said control means being operative normally to cause said motor and consequently said device to move to a position dependent upon the state of said condition responsive member, and means including an element directly responsive to the same condition but only slowly responsive thereto operative upon a change in the demand for conditioning slowly to adjust the control action of said first mentioned condition responsive member in such a manner that said condition responsive member may return to substantially its normal position while maintaining said regulating device in a new position corresponding to the changed demand for conditioning.

6. In a condition control system of the follow-up type, means for changing the value of a condition, a regulating device for said condition changing means, a motor for positioning said device, control means including a member responsive to a controlling condition over a limited range of values of said condition and a follow-up means driven by said motor, said control means being operative normally to cause said motor to move said device slowly to a position dependent upon the state of said condition responsive member, means to limit the range of movement of the device resulting from a change of said condition over the range of response of said first named condition responsive member, and means including a relatively slow moving motor means for slowly shifting the range of movement of the device.

7. In a condition control system of the follow-up type, means for changing the value of a condition, a regulating device for said condition changing means, a motor for positioning said device, control means including a member relatively quickly responsive to a change in the value of a condition and a follow-up means driven by said motor, said control means being operative normally to cause said motor and consequently said device to move to a position dependent upon the position of said condition responsive member, and means jointly controlled by a member quickly responsive and a member slowly responsive to the same condition and operative when the condition change is more rapid than the response of the slowly responsive member to decrease the amount of movement of the regulating device for a given movement of the condition responsive member.

8. In a condition control system of the follow-up type, means for changing the value of a condition, a regulating device for said condition changing means, a motor for positioning said device, a condition responsive variable impedance, a follow-up variable impedance operatively connected to said motor and varied thereby, means controlled by the relative values of said impedances for controlling the energization of the motor, further impedance means for decreasing the effect of the condition responsive impedance and hence decreasing the movement of the motor resulting from a given change in the value of the condition, and means for slowly adjusting the relative effects of the impedance means to establish a normal relationship between the effects of the two.

9. In a condition control system of the follow-up type, means for changing the value of a condition, a regulating device for said condition changing means, a motor for positioning said device, a variable impedance adjusted by an element relatively quickly and directly responsive to changes in the value of a controlling condition, a follow-up variable impedance operatively connected to said motor and varied thereby, means controlled by the relative values of said impedances for controlling the energization of the motor, and further variable impedance means adjusted by an element only slowly but directly responsive to changes in the value of said controlling condition and operative upon a continued change in the value of the condition to adjust the effect of the first named impedance.

10. In a condition control system of the follow-up type, means for changing the value of a condition, a regulating device for said condition changing means, a motor for positioning said device, a variable impedance adjusted by an element relatively quickly and directly responsive to changes in the value of a controlling condition over a limited range of values of said condition, a follow-up variable impedance operatively connected to said motor and varied thereby, means controlled by the relative values of said impedances for controlling the energization of the motor, and further variable impedance means adjusted by an element only slowly but directly responsive to changes in the value of said controlling condition and operative upon a continued change in the value of the condition slowly to shift the range of movement of the motor resulting from a change in the first named variable impedance over said limited range of response.

11. In a condition control system of the follow-up type, means for changing the value of a condition, a regulating device for said condition changing means, a motor for positioning said device, a variable impedance adjusted by an element relatively quickly and directly responsive to changes in the value of a controlling condition, a follow-up variable impedance operatively connected to said motor and varied thereby, means controlled by the relative values of said impedances for controlling the energization of the motor, and further variable impedance means adjusted by an element only slowly but directly responsive to changes in the value of said controlling condition and operative upon a change in the demand for conditioning slowly to adjust the control effect of said first named variable impedance in such a manner that said impedance can return to substantially its normal value while maintaining said regulating device in a new position corresponding to the changed demand for conditioning.

12. In a condition control system of the follow-up type, means for changing the value of a condition, a regulating device for said condition changing means, a motor for positioning said device, a relay having a pair of oppositely acting coils, a source of power, a control potentiometer actuated by means responsive to a controlling condition, a follow-up potentiometer actuated by said motor, each of said potentiometers including a relatively movable impedance and contact, means for so connecting said relay coils and said potentiometers to said source of power that the relative energization of said relay coils is determined by the relative positions of the contacts and impedances of said two potentiometers, further variable impedance means associated with the connections between the control potentiometer and the relay coils for changing the effect of the control potentiometer upon the energization of the relay, and means including an element only slowly but directly responsive to said controlling condition for varying said further variable impedance means.

13. In a condition control system of the follow-up type, means for changing the value of a condition, a regulating device for said condition changing means, a motor for positioning said device, a relay having a pair of oppositely acting coils, a source of power, a control potentiometer actuated by means responsive to a controlling condition, a follow-up potentiometer actuated by said motor, each of said potentiometers including a relatively movable impedance and contact, means for so connecting said relay coils and said potentiometers to said source of power that the relative energization of said relay coils is determined by the relative positions of the contacts and impedances of said two potentiometers, a third potentiometer connected in parallel with the control potentiometer for changing the effect of the control potentiometer upon the energization of the relay, and means including an element only slowly but directly responsive to said controlling condition for varying said third potentiometer.

14. In a condition control system of the follow-up type, means for changing the value of a condition, a regulating device for said condition changing means, a motor for positioning said device, a relay having a pair of oppositely acting coils, a source of power, a control potentiometer actuated by means responsive to a controlling condition, a follow-up potentiometer actuated by said motor, each of said potentiometers including a relatively movable impedance and contact, means for so connecting said relay coils and said potentiometers to said source of power that the relative energization of said relay coils is determined by the relative positions of the contacts and impedances of said two potentiometers, a pair of variable impedances, one in the connections between each relay coil and the control potentiometer, and means including an element only slowly but directly responsive to said controlling condition for oppositely varying said impedances to vary the effect of the control potentiometer upon the energization of the relay coils.

15. In a condition control system of the follow-up type, means for changing the value of a condition, a regulating device for said condition changing means, a motor for positioning said device, a main controller relatively quickly responsive to changes in the value of a controlling condition, a follow-up controller operatively connected to said motor and positioned thereby, means controlled by the relative positions of said controllers for controlling the operation of the motor, and a further controller including an element only slowly but directly responsive to changes in the value of the controlling condition and operative upon a continued change in the value of the condition to adjust the effect of the main controller.

16. In a condition control system of the follow-up type, means for changing the value of a condition, a regulating device for said condition changing means, a motor for positioning said device, a main controller relatively quickly responsive to changes in the value of a controlling condition over a relatively wide range, a follow-up controller operatively connected to said motor and positioned thereby, means controlled by the relative positions of said controllers for controlling the operation of the motor, the relationship between the main controller and the follow-up controller being such that a unit change in the value of the condition acting through said main controller produces only a relatively small change in the position of the regulating device, and a further controller including an element only slowly but directly responsive to changes in the value of the controlling condition, the relationship between said further control means and said follow-up controller being such that a unit change in the value of the condition acting through said further controller produces a relatively large change in the position of the regulating device.

WILLIAM L. McGRATH.